(12) United States Patent
Ebeling

(10) Patent No.: US 12,203,953 B2
(45) Date of Patent: Jan. 21, 2025

(54) HELIX WASH STATION THAT AUGMENTS THE FLUID DYNAMICS ASSOCIATED WITH CLINICAL CHEMISTRY AND IMMUNOASSAY PROBE CLEANING

(71) Applicant: Siemens Healthcare Diagnostics Inc., Tarrytown, NY (US)

(72) Inventor: Christopher Ebeling, Newfoundland, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/007,132

(22) PCT Filed: Jul. 15, 2021

(86) PCT No.: PCT/US2021/041899
§ 371 (c)(1),
(2) Date: Jan. 27, 2023

(87) PCT Pub. No.: WO2022/026205
PCT Pub. Date: Feb. 3, 2022

(65) Prior Publication Data
US 2023/0213542 A1 Jul. 6, 2023

Related U.S. Application Data

(60) Provisional application No. 63/058,358, filed on Jul. 29, 2020.

(51) Int. Cl.
*G01N 35/10* (2006.01)
*B08B 3/04* (2006.01)

(52) U.S. Cl.
CPC .......... *G01N 35/1004* (2013.01); *B08B 3/04* (2013.01)

(58) Field of Classification Search
CPC ...................................................... B08B 3/04
See application file for complete search history.

(56) References Cited

U.S. PATENT DOCUMENTS

| 5,201,232 A | 4/1993 | Uffenheimer |
| 2003/0164049 A1* | 9/2003 | Oddie ................. G01F 1/34 |
| | | 73/152.36 |

(Continued)

FOREIGN PATENT DOCUMENTS

| JP | 2001-133466 A | 5/2001 |
| JP | 2008-500516 A | 1/2008 |

(Continued)

OTHER PUBLICATIONS

PCT International Search Report and Written Opinion dated Oct. 26, 2021 (7 Pages).

(Continued)

*Primary Examiner* — P. Kathryn Wright
*Assistant Examiner* — Curtis A Thompson

(57) ABSTRACT

A wash station for use in a clinical analyzer of an in vitro diagnostics (IVD) environment for cleaning a probe comprises a basin, a vertically-elongated conduit, an inlet port, and a helix insert. The vertically-elongated conduit is attached to the interior of the basin. The inlet port is connected to a bottom portion of the basin. The inlet port is sized to receive and secure a wash feed line that propels a wash fluid upward through the vertically-elongated conduit. The helix insert is positioned within the vertically-elongated conduit and sized to allow insertion of the probe through a center portion of the helix insert for cleaning. The helix insert causes the wash fluid to flow in a helical shape around the probe as it is transported through the vertically-elongated conduit, thereby cleaning the probe.

19 Claims, 6 Drawing Sheets

(56) References Cited

U.S. PATENT DOCUMENTS

| | | | |
|---|---|---|---|
| 2005/0051642 A1 | 3/2005 | Negoro | |
| 2008/0099057 A1* | 5/2008 | Dunfee | B08B 3/04 |
| | | | 134/198 |
| 2008/0302393 A1* | 12/2008 | Jafari | B08B 9/00 |
| | | | 134/137 |
| 2009/0101175 A1 | 4/2009 | Honkanen et al. | |
| 2009/0114250 A1* | 5/2009 | Hayashi | B01L 13/02 |
| | | | 134/166 R |
| 2011/0017238 A1* | 1/2011 | Kuroda | G01N 35/1004 |
| | | | 134/166 C |
| 2011/0262919 A1* | 10/2011 | Tajima | G01N 35/026 |
| | | | 435/6.12 |
| 2012/0227771 A1* | 9/2012 | Waterbury | G01N 35/1004 |
| | | | 15/322 |
| 2015/0192601 A1* | 7/2015 | Cohen | G01N 35/1004 |
| | | | 15/160 |
| 2015/0276772 A1* | 10/2015 | Dockrill | G01N 35/00029 |
| | | | 435/40.52 |
| 2016/0069922 A1* | 3/2016 | Horiuchi | G01N 35/025 |
| | | | 250/431 |
| 2019/0369132 A1 | 12/2019 | Nonaka et al. | |
| 2019/0391171 A1 | 12/2019 | Nagai et al. | |

FOREIGN PATENT DOCUMENTS

| | | |
|---|---|---|
| JP | 2009-222593 A | 10/2009 |
| JP | 2014-167401 A | 9/2014 |
| WO | 2017/197025 A1 | 11/2017 |

OTHER PUBLICATIONS

Extended EP Search Report dated Dec. 15, 2023 of corresponding European Application No. 21848824.5, 4 Pages.

* cited by examiner

HELIX WASH STATION THAT AUGMENTS THE FLUID DYNAMICS ASSOCIATED WITH CLINICAL CHEMISTRY AND IMMUNOASSAY PROBE CLEANING

CROSS REFERENCE TO RELATED APPLICATION

This application claims the benefit of U.S. Provisional Patent Application No. 63/058,358, entitled "A HELIX WASH STATION THAT AUGMENTS THE FLUID DYNAMICS ASSOCIATED WITH CLINICAL CHEMISTRY AND IMMUNOASSAY PROBE CLEANING" filed Jul. 29, 2020, the disclosure of which is incorporated by reference in its entirety for all purposes.

TECHNICAL FIELD

The present disclosure is directed, in general, to clinical chemistry and immunoassay probe cleaning, and more particularly to a wash station that includes one or more helix-based mechanisms for augmenting the fluid dynamics of the cleaning process.

BACKGROUND

Clinical analyzers typically utilize hypodermic needle-like probes to aspirate and dispense fluids, such as patient samples and reagents, transferring the fluids between vessels and containers. For example, probes are used in a clinical analyzer to transfer fluid between a reagent container and a reaction vessel and between a primary patient sample container and a dilution vessel. The probes need to be cleaned between transfers to avoid "carrying over" fluids from one reaction to another. Carryover can lead to incorrect results of a patient test through either unintended introduction of trace amounts of a previously used reagent, or by introduction of analytes that were present in a previously-handled patient sample. Thus, it is important to thoroughly clean the transfer probes between deliveries.

Cleaning of the probes typically requires water, although for some non-water-soluble reagents or for an absolutely thorough removal of patient sample, chemical cleaners may be introduced. The inside of the probe is often rinsed by flowing water at high velocity through the probe, while the outside is rinsed by immersing the probe in flowing water. The water is then removed via a drain to a waste vessel, either by gravity or with a vacuum assist.

Probe exteriors may also often be rinsed mid-transfer (i.e., between the aspiration and dispense) to remove any extra (or unmetered) fluid that adhered to the exterior of the probe while the fluid was aspirated. This prevents the unmetered fluid from being introduced to the destination vessel, which could cause an incorrect or imprecise result of the reaction.

Probe rinsing is performed by a component of the system, referred to herein as a "probe wash station." Conventional probe wash stations either use low-speed water flow or high-speed, vacuumed air to clean the probe. For example, some systems utilize an expensive air vacuum driven system because it was needed to develop enough shear-stress to clean the probe and eliminate carryover. Water-based systems are less expensive; however, characterization work has found that such wash stations do not completely mitigate reagent carryover. In all conventional wash stations, the flow structures and flow paths are unguided along the length of the probe.

SUMMARY

Embodiments of the present invention address and overcome one or more of the above shortcomings and drawbacks by providing a helix wash station that augments the fluid dynamics associated with clinical chemistry and immunoassay probe cleaning. As noted above, conventional designs do not develop and optimize the flow around the probe to favor probe cleaning. The helix augments the shear stress and residence time of the cleaning fluid to strip the probe of containments.

According to some embodiments, a wash station for use in a clinical analyzer of an in vitro diagnostics (IVD) environment for cleaning a probe comprises a basin, a vertically-elongated conduit, an inlet port, and a helix insert. The vertically-elongated conduit is attached to the interior wall of the basin. The inlet port is connected to a bottom portion of the basin. The inlet port is sized to receive and secure a wash feed line that propels a wash fluid upward through the vertically-elongated conduit. The helix insert is positioned within the vertically-elongated conduit and sized to allow insertion of the probe through a center portion of the helix insert for cleaning. The helix insert causes the wash fluid to flow in a helical shape around the probe as it is transported through the vertically-elongated conduit, thereby cleaning the probe.

According to another embodiment, a wash station for use in a clinical analyzer of an IVD environment for cleaning a probe comprises a basin, a vertically-elongated conduit, and an inlet port. The vertically-elongated conduit is attached to the basin and sized to receive the probe for cleaning. The inlet port secures a wash feed line that propels a wash fluid through the vertically-elongated conduit. The vertically-elongated conduit comprises one or more mechanisms that cause the wash fluid to flow in a helical shape around the probe as it is transported through the vertically-elongated conduit, thereby cleaning the probe.

According to another embodiment, a method for cleaning a probe in an IVD environment includes inserting the probe in a vertically-elongated conduit attached to the interior of a basin. A helix insert is positioned within the vertically-elongated conduit and the probe is inserted through a center portion of the helix insert. A wash fluid is propelled upward through the vertically-elongated conduit. The helix insert causes the wash fluid to flow in a helical shape around the probe as it is transported through the vertically-elongated conduit thereby cleaning the probe.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to a wash station designed with a helix insert. More specifically, embodiments of the present invention are directed to a wash station comprising a wash nozzle for providing a fluid (e.g., water) source to clean an exterior portion of a probe, a helix insert that directs fluid in a helical shape around the probe, and a basin allowing for waste fluid and fluid ejected from within the probe to be collected and drained. The helix provides a variety of features that are desirable for a fluid dynamics cleaning of a surface including, without limitation, increasing the wall shear stress on the probe, increasing the residence time of the flow, and allowing the flow to develop a velocity profile. Computational fluid dynamics (CFD) may be used to understand the improvement in cleaning.

Figure 1:
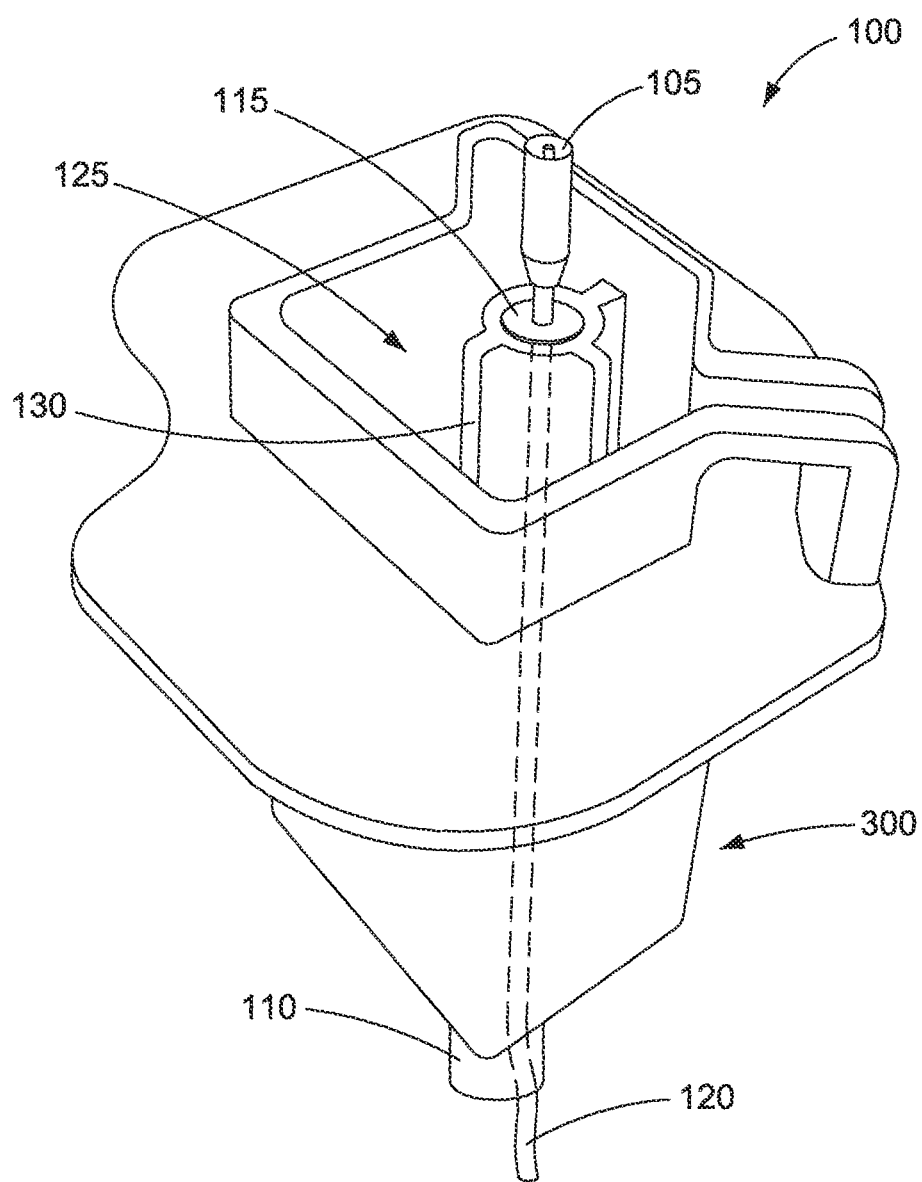
FIG. 1 provides a perspective view of a wash station, according to some embodiments.

FIG. 1 provides a perspective view of a wash station 100, according to some embodiments. The wash station 100 includes a fluid inlet port 110 and a basin 300. The internal cavity 125 of the basin 300 comprises a vertically-elongated conduit 130 that is sized to hold a probe 105 for cleaning. The vertically-elongated conduit 130 can have a variety of different shapes, including a cylinder as shown in the embodiment in FIG. 1. A fluid inlet port 110 located at the bottom portion of the basin 300 secures a wash feed line 120. The wash feed line 120 fills the vertically-elongated conduit 130 with fluid 115 to facilitate the cleaning. In some embodiments, the pressure of the wash feed line 120 is approximately 11 psi. After the vertically-elongated conduit 130 is completely filled with fluid 115, the wash feed line 120 continues to deliver the fluid 115 such that it overflows into the internal cavity 125 of the basin 300 for draining.

Figure 2:
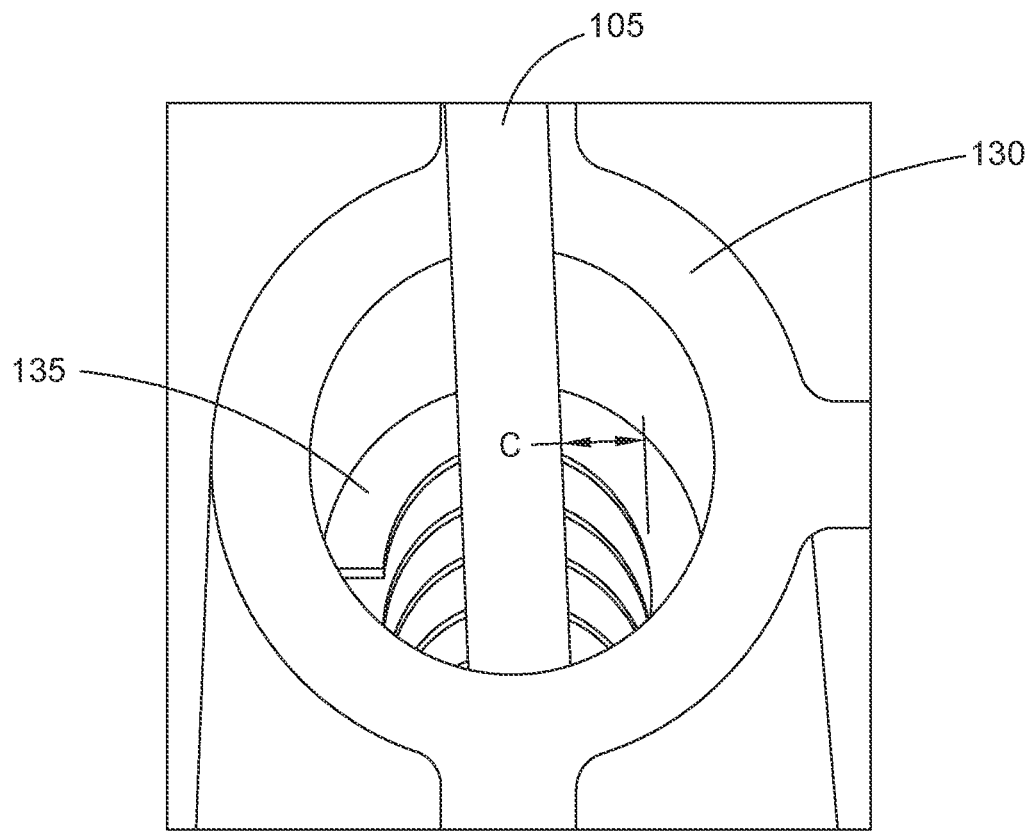
FIG. 2 provides an internal view of the vertically-elongated conduit of the wash station with the fluid removed.

FIG. 2 provides an internal view of the vertically-elongated conduit 130 of the wash station 100 with the fluid 115 removed. This view shows the helix insert 135 in the vertically-elongated conduit 130 of the basin 300 (shown in FIG. 1). As fluid fills the vertically-elongated conduit 130, the helix insert 135 causes the fluid to flow in a helical shape as it is transported through the vertically-elongated conduit 130 to provide for more efficient cleaning compared to conventional probe cleaning systems. Because the helix insert 135 displaces volume and tightly hugs the probe 105, the flow velocity increases and results in higher shear stress. Thus, the helix insert 135 causes more interaction between the probe 105 and fluid which, in turn, helps to reduce cleaning time. The helix also creates a unique velocity profile, unlike that of flow between concentric cylinders, that is beneficial to cleaning. In various embodiments, the helix insert 135 can be shaped as a circular helix, such as in the embodiment shown in FIG. 3A, or a conic helix, such as in the embodiment shown in FIG. 3B.

As shown in FIG. 2, the helix insert 135 is defined by the following parameters. The free length of helix insert 135 is the length of the spring in the free or unloaded condition. This may be contrasted with the solid length which is the length of the helix insert 135 while in a compressed state. The solid length is a product of the number of coils and the dimensions of the wire or other material that is wound into the helix. The pitch is the distance from center to center of adjacent coils. The angle between the coils and the base of the helix insert 135 is the helix angle. Finally, the mean helix diameter is the average of the outer diameter and inner diameter of the helix insert 135. While the exact value of the parameters can vary according to different embodiments of the present invention, in an exemplary embodiment the parameters are as follows: rectangular profile, width=2.25 mm, height=1 mm, pitch=5 mm: helix angle=11.3 deg: helix outer diameter=8 mm: helix inner diameter=3.5 mm and free length=50 mm. It should be noted that, although the example of FIG. 2 shows a right-handed helix, other embodiments of the intention may utilize a left-handed helix. The helix inner diameter can be selected to provide a clearance, designated "c" in FIG. 2, between the probe 105 and the helix insert 135. In one embodiment, the clearance can be equal to 0.5 mm. Further, the pitch of the helix insert 135 can be defined with respect to the length of the vertically-elongated conduit 130. For example, the pitch of the helix insert 135 can be a particular ratio with respect to the length of the vertically-elongated conduit 130. In one embodiment, the pitch of the helix insert 135 can be equal to one tenth the length of the vertically-elongated conduit 130.

In some embodiments, this helix insert 135 is integrated with the vertically-elongated conduit 130. For example, in one embodiment, the basin 300 (shown in FIG. 1) is 3D printed and the helix insert 135 is printed with the vertically-elongated conduit 130 as a single component. In other embodiments, the helix insert 135 is an insert placed in the vertically-elongated conduit 130 and secured, for example, via compression or with internal tabs or other securing mechanisms (not shown in FIG. 1) in the vertically-elongated conduit 130. In one embodiment, the helix insert 135 can be attached to an interior wall of the vertically-elongated conduit 130. The helix insert 135 may be composed of, for example, rubber or a similar material.

In some embodiments, rather than have a physical component as the helix insert 135, the helical flow is created by one or more jet nozzles that inject pressurized fluid into the vertically-elongated conduit 130. More specifically, one or more jet feed lines can be installed at openings on the side wall of the vertically-elongated conduit 130. The angle of inclination of the jet feed lines with respect to the floor of the basin can be varied as desired to create the desired helix angle. In some embodiments, rather than have a specialized jet feed line that supplements the wash feed line 120 (see FIG. 1), the wash feed line 120 itself may serve as the jet feed line.

Figure 3A:
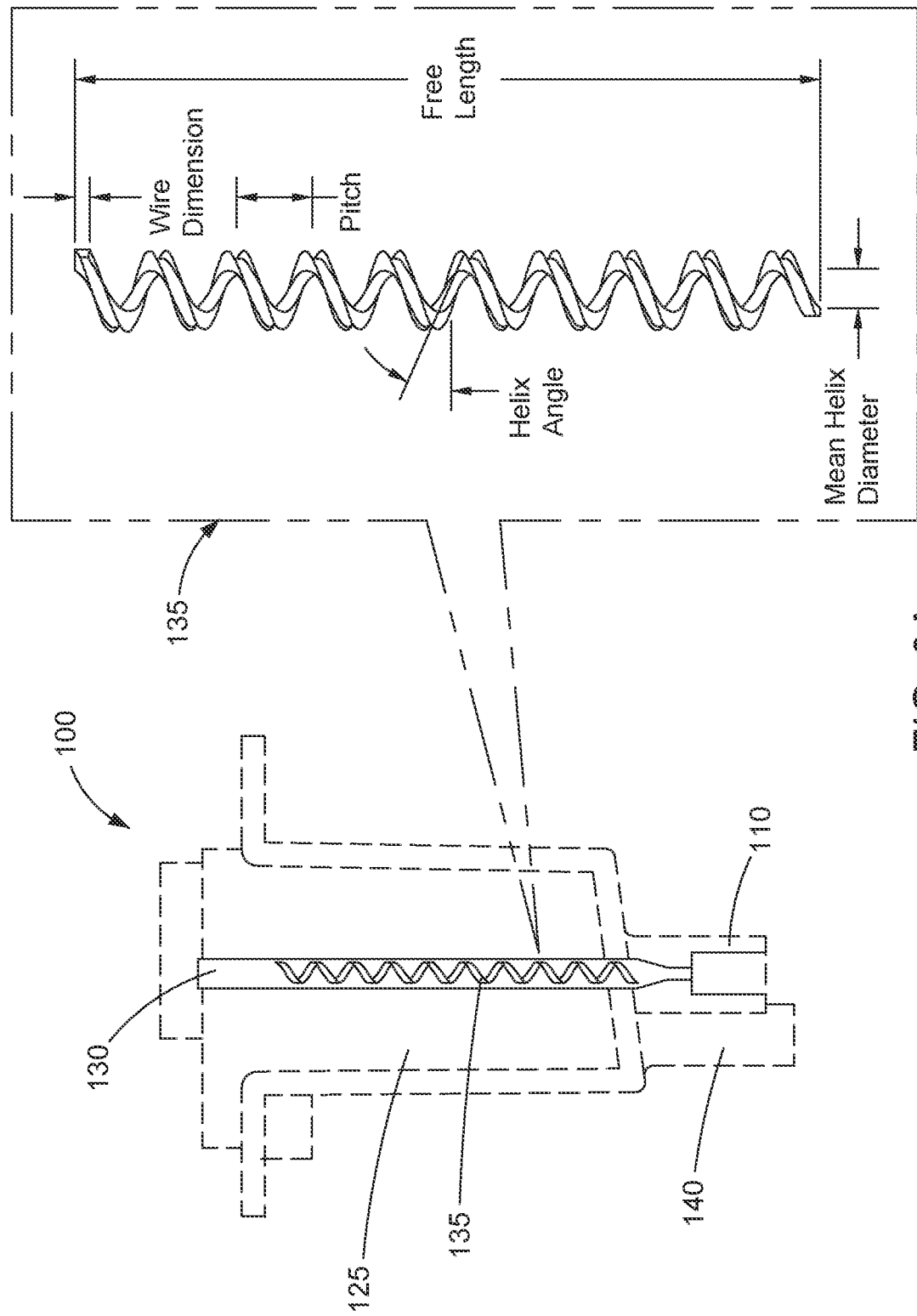
FIG. 3A shows a cutaway view of the wash station having a helix insert in the shape of a circular helix, according to some embodiments.
Figure 3B:
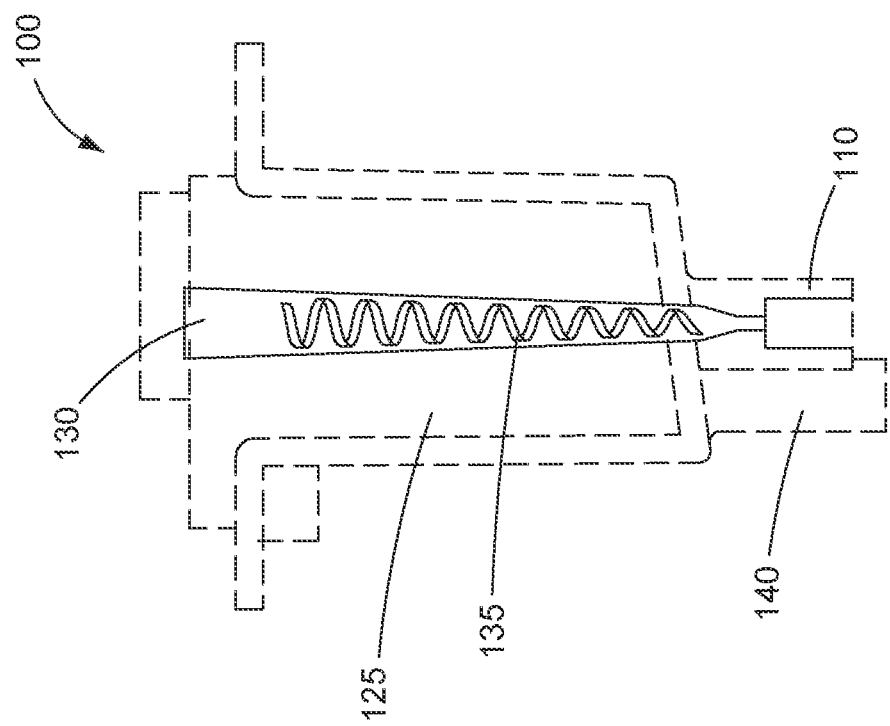
FIG. 3B shows a cutaway view of the wash station having a helix insert in the shape of a conic helix, according to some embodiments.

FIGS. 3A and 3B show cutaway views of the wash station 100, according to some embodiments. In the embodiment shown in FIG. 3A, the helix insert 135 is in the shape of a circular helix, whereas in the embodiment shown in FIG. 3B, the helix insert 135 is in the shape of a conic helix. As shown in these examples, the helix insert 135 extends the length of the vertically-elongated conduit 130 into the top of the fluid inlet port 110. Without the helix insert 135, fluid would extend in a generally straight upward direction along the length of the vertically-elongated conduit 130. However, the helix insert 135 imparts a rotational force that causes the fluid to proceed up the vertically-elongated conduit 130 in the shape of a helix. As the fluid overflows the vertically-elongated conduit 130, it is collected in the internal cavity 125 before draining out a drain port 140 on the underside of the wash station 100. Furthermore, for the assumed contact angles, rotational flow caused by the helix lowers the height of the free surface at the probe (because the probe sits in the eye of the rotational flow where the water height is lowest, it might not lower the height at the spill over walls) at the spill over walls in comparison to conventional systems. Therefore, the chance of sleeve contamination is reduced during wash.

It should be noted that the helix insert 135 could be extended even further up the vertically-elongated conduit 130 to cover more of the probe's height. The only limitation to the length of the helix insert 135 is how it disturbs the free surface of the wash station 100. For example, a wave of fluid generated by the helix insert 135 should not hit the stainless steel sleeve of the probe.

Figure 4:
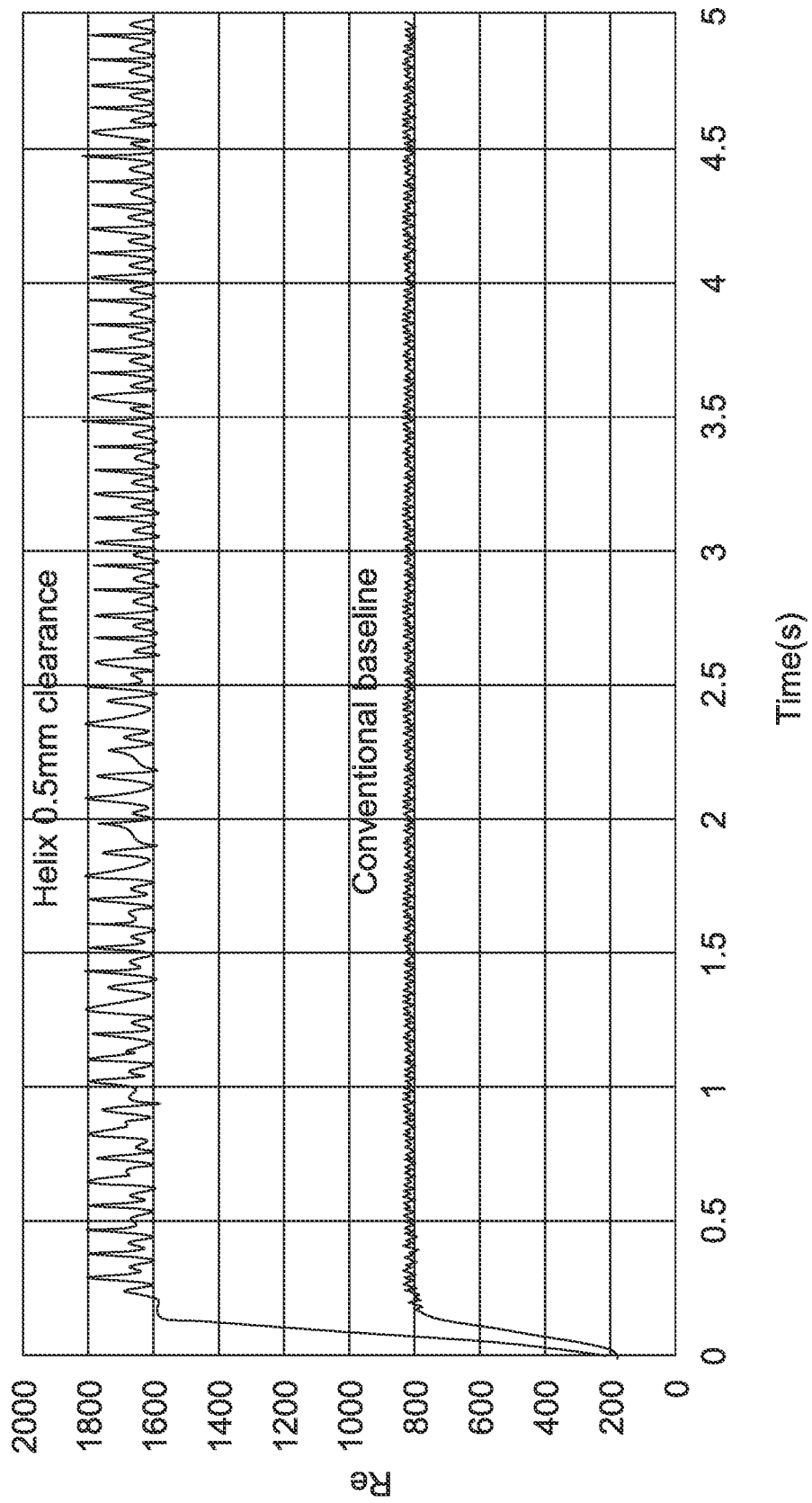
FIG. 4 shows a plot of Reynolds number vs. time for comparing a wash station with a helix insert with a conventional wash station.

FIG. 4 shows a plot of Reynolds number vs. time for comparing a wash station with a helix insert with a conventional wash station. Reynolds number is the ratio of inertial forces to viscous forces. As shown in this example, the helix insert significantly increases the inertial forces around the probe. The Reynolds number settles out after approximately 0.5 seconds.

Figure 5:
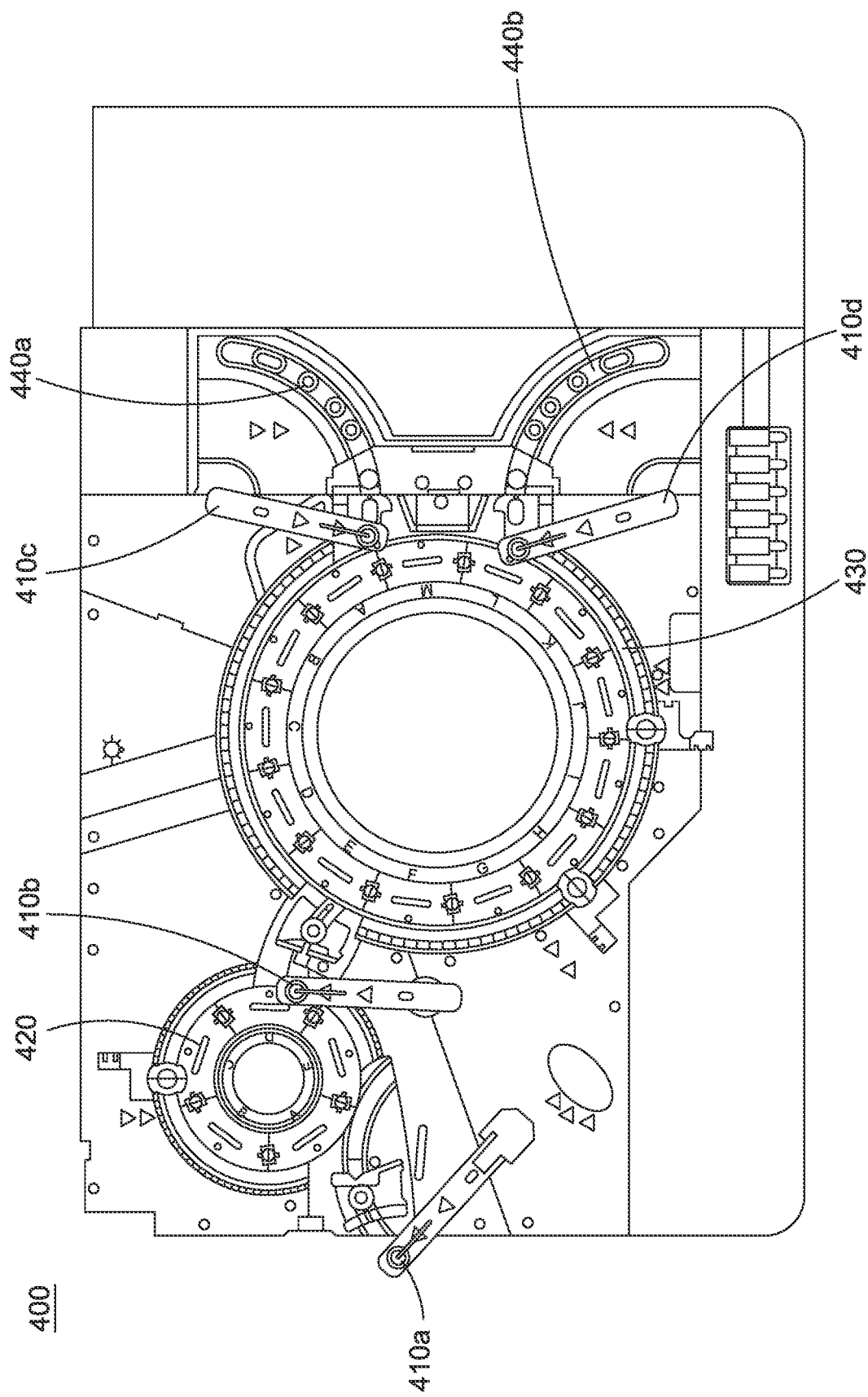
FIG. 5 provides a layout of an example system architecture within which embodiments of the invention may be implemented, according to an embodiment.

FIG. 5 provides a layout of an example system architecture 400 within which embodiments of the invention may be implemented, according to an embodiment. Shown in FIG. 5 are various transfer arms 410 (410a, 410b, 410c, and 410d) with respective probes (such as the probe 105 described above with respect to the wash station 100); a diluting turntable 420 including a plurality of diluting containers arranged in one or more diluting rings: a reaction turntable 430 including a plurality of reaction containers arranged in one or more reaction rings; and reagent storage areas 440a and 440b dedicated to storage and supply of a respective reagent, each reagent storage area 440a and 440b may also include a plurality of reagent containers. In operation, transfer arm 410a and its respective probe may operate to transfer sample from an access position to one or more diluting containers on the diluting turntable 420 to create a dilution therein. Transfer arm 410b and its respective probe may operate to transfer dilution from a diluting container to a reaction container on the reaction turntable 430. Transfer arms 410c and 410d and their respective probes may operate to transfer a reagent from reagent storage area 440a and 440b, respectively, to a reaction container on the reaction turntable 430. The various transfers occur by use of a pumping mechanism, such as a displacement pump, for example, attached to the transfer arms 410. Additionally, the system architecture 400 includes one or more controllers (not shown) for controlling operation of the various components, including the transfer arms 410, the probes, and the turntables.

According to an embodiment, one or more wash stations 100 are mounted to the baseplate of the architecture 400, in locations where the probes can be reached via their respective transfer arm 410. In one embodiment, the architecture 400 can be embodied as a clinical analyzer. The system architecture 400 of FIG. 5 and the accompanying descriptions are purely exemplary and non-limiting to the wash station 100 disclosed herein. The system architecture 400 is just one example system in which the wash station 100 according to embodiments herein may be implemented.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112 (f) unless the element is expressly recited using the phrase "means for."

I claim:

1. A wash station for use in a clinical analyzer of an in vitro diagnostics (IVD) environment for cleaning a probe, the wash station comprising:
   a basin;
   a vertically-elongated conduit attached to an interior of the basin;
   an inlet port in a bottom portion of the basin coupled to a pressurized wash feed line that propels water upward through the vertically-elongated conduit; and
   a helix insert positioned within the vertically-elongated conduit and sized to allow insertion of the probe through a center portion of the helix insert for cleaning while providing a predetermined clearance with respect to insertion of the probe,
   wherein the helix insert is situated and further sized such that the helix insert causes the water to flow in a helical shape around the probe with a Reynolds number between 1400 and 2000 when the pressurized wash feed line is pressurized at 11 psi, thereby cleaning the probe with laminar flow in the vertically elongated conduit.

2. The wash station of claim 1, wherein the vertically-elongated conduit is attached to at least one interior wall of the basin.

3. The wash station of claim 1, wherein the vertically-elongated conduit is a cylinder.

4. The wash station of claim 1, wherein the helix insert is a conic helix.

5. The wash station of claim 1, wherein the helix insert is a circular helix.

6. The wash station of claim 1, wherein the helix insert is attached to an interior wall of the vertically-elongated conduit.

7. The wash station of claim 1, wherein the helix insert is secured within the vertically-elongated conduit by compression of the helix insert.

8. The wash station of claim 1, wherein the basin comprises a drain port for releasing the water overflowing from the vertically-elongated conduit into the basin.

9. The wash station of claim 1, wherein the predetermined clearance is 0.5 mm.

10. The wash station of claim 1, wherein the helix insert has a pitch equal to one tenth the length of the vertically-elongated conduit.

11. The wash station of claim 1, wherein the wash station is mounted on a baseplate of the clinical analyzer.

12. A wash station for use in a clinical analyzer of an in vitro diagnostics (IVD) environment for cleaning a probe, the wash station comprising:
- a basin;
- a vertically-elongated conduit attached to the basin and sized to receive the probe for cleaning comprising a helix on an interior wall of the conduit that has an opening with a predetermined radial clearance relative to the probe; and
- an inlet port located at the bottom of the basin that secures a pressurized wash feed line and propels water through the vertically-elongated conduit;
- wherein the helix is situated and sized such that the water flows in a helical shape around the probe with a Reynolds number between 1400 and 2000, when the pressurized wash feed line is pressurized at 11 psi, thereby cleaning the probe with laminar flow in the vertically elongated conduit.

13. The wash station of claim 12, wherein the vertically-elongated conduit is attached to at least one interior wall of the basin.

14. The wash station of claim 12, wherein the vertically-elongated conduit is a cylinder.

15. The wash station of claim 12, wherein the helix comprise a conic helix insert attached to an interior wall of the vertically-elongated conduit.

16. The wash station of claim 12, wherein the helix comprise a circular helix insert attached to an interior wall of the vertically-elongated conduit.

17. The wash station of claim 12, wherein the basin comprises a drain port for releasing the water overflowing from the vertically-elongated conduit into the basin.

18. The wash station of claim 12, wherein the wash station is mounted on a baseplate of the clinical analyzer.

19. A method for cleaning a probe in an in vitro diagnostics (IVD) environment, the method comprising:
- inserting the probe in a vertically-elongated conduit attached to an interior of a basin, wherein a helix insert is positioned within the vertically-elongated conduit and the probe is inserted through a center portion of the helix insert while providing a predetermined clearance with respect to insertion of the probe; and
- propelling water upward through the vertically-elongated conduit, wherein the helix insert causes the water to flow in a helical shape around the probe as the water is transported through the vertically-elongated conduit with a Reynolds number between 1400 and 2000, thereby cleaning the probe when the pressurized wash feed line is pressurized at 11 psi, thereby cleaning the probe with laminar flow in the vertically elongated conduit.

* * * * *